United States Patent Office 3,368,987
Patented Feb. 13, 1968

3,368,987
STARCH COMPOSITION MODIFIED WITH HALF AMIDE/HALF SALT STYRENE MALEIC ANHYDRIDE COPOLYMERS
Kenneth A. Pollart, Kirkwood, and August F. Ottinger, St. Louis, Mo., assignors to Monsanto Company, St. Louis, Mo., a corporation of Delaware
No Drawing. Continuation-in-part of application Ser. No. 345,117, Feb. 17, 1964. This application Jan. 4, 1965, Ser. No. 423,344
17 Claims. (Cl. 260—17.4)

ABSTRACT OF THE DISCLOSURE

This invention relates to compositions comprising starch and half-amide/half salt styrene-maleic anhydride copolymers having molecular weights of from about 2,000 to about 10,000.

---

This application is a continuation-in-part of application Ser. No. 345,117, now abandoned, filed Feb. 17, 1964.

This invention relates to starch modifiers and particularly to modifiers which improve the characteristics of starch for use in a surface size, in an opacifying wash coating or aqueous pigment containing compositions, and as a pigment binder or adhesive in mineral or pigmented coatings for paper having high brightness, high gloss and good affinity for printing inks.

Starch has been used extensively as a paper size. Although it has many advantageous properties, it is seriously deficient in its resistance to water. This has led to the development of various means and methods in attempts to improve the water-resistance of paper treated with starch. These previous attempts have met with only a modicum of success. While the water-resistance characteristics of paper have been enhanced in a number of instances, the agents employed either detracted from other desirable properties of the paper or required expensive and hazardous solvents.

Aqueous starch dispersions containing small amounts of particulate minerals and/or pigments generally from 1 to 25 or 30 percent total solids by weight, including varying ratios of the mineral or pigment and starch, termed wash coatings or opacifying compositions, have been applied to cellulose webs, sheets, or formed articles to provide more opaque or brighter surfaces. For the reproduction of fine half-tone cuts on printed papers an important criterion is that the surface printed upon shall be very level. Mineral coated paper which is generally supercalendered after the coating operation is generally used for such fine printing purposes. By the term "mineral coated paper" is meant paper comprising a fibrous base having on one or both surfaces a continuous layer of mineral pigment composition which covers the fibers of the base and fills the hollows between the fibers on the surfaces of the base so that when the coated paper is calendered, it has a smooth, even and continuous surface. The mineral coating composition is generally applied to the fibrous base or paper sheet in the form of a thick aqueous dispersion of high solids content, say, at least about 30 percent solids up to about 70 percent by weight. In this mineral coating composition the mineral or pigment or mixtures thereof generally comprises the major component, running usually from 65 to about 90 percent by weight of the total solids content of the dispersion. However, unless the pigment or mineral coating is suitably bonded to itself and to the paper fibers, it will rub off, particularly if the coated paper surface is moistened as occurs in offset printing practices. It is also necessary that the coated paper have good receptivity or affinity of inks which are quite tacky or sticky, and that the ink becomes set satisfactorily on the coated paper, that is, in a relatively short time. Commonly employed pigments and/or minerals are clay, calcium carbonate, blanc fixe, talc, titanium dioxide, and the like.

Starch has been employed generally prior to this invention as a binder or adhesive in the pigment or mineral coating compositions for application to paper. Paper coaters desire to use starch because of its availability and favorable cost. However, the use of starch as a pigment binder for preparing coated paper leaves much to be desired. The use of starch provides a paper having poor water resistance. Also, starch because of its relative brittle nature may fracture upon calendering and thus give weakened coatings. In addition when the pigment or mineral component or mixture contains calcium carbonate and the like, starch does not prevent the decomposition of calcium carbonate and entrapment of carbon dioxide gas generated thereby under the particulate calcium carbonate platelets of the pigment when acid materials are present. When this occurs the surface of the paper becomes uneven, and in severe cases more complicating problems such as foaming, ink pollution, uneven printing, etc. can arise.

In pigment coating compositions for use in coating paper, attempts have been made to improve the pigment binding characteristics of paper chemicals by either completely replacing starch or by modifying starch with high molecular weight polymeric materials. Among such materials which have been tried as complete replacements for starch as a pigment binder has been the water-soluble derivatives of high molecular weight styrene-maleic anhydride copolymers, such as the alkali metal or ammonium salts, or even the partial amide-ammonium salts. These copolymers were of high molecular weight so as to have viscosity in the range of from 5 to 30 centipoises at 25° C. in an 0.2% aqueous solution adjusted to pH 5.5–5.6 with NaOH. It is estimated that copolymers of this viscosity have a molecular weight of at least 15,000 and most are much higher than that, say up to 50,000 to 100,000. Prior to this invention it was believed necessary to use these high molecular weight copolymers to obtain good binding of the pigment component by the binder or adhesive and to maintain substantial water resistance of the pigment coating composition applied to the paper. However, the use of such high molecular weight copolymers as pigment binders was not without disadvantages. Among the disadvantages was the operational difficulty which occurred in applying the pigment coating composition to the paper. The binders or adhesives either alone or mixed with starch and the pigment caused the composition to be too viscous to be applied at high machine speeds with good results in terms of level coatings, etc. However, it has been found that mere use of water soluble salts of low molecular weight copolymers in general does not provide the necessary water resistance either alone or admixed with starch or the needed wet rub resistance when applied as the binder with starch as a pigment binder in pigment coating compositions for paper. For example, use of the diammonium salt or disodium salt of styrene-maleic anhydride copolymer having a molecular weight below about 10,000 gives products having two to seven times less wet rub resistance and about up to ten times less water resistance than the compositions of this invention.

By this invention, compositions comprising starch and certain water soluble low molecular weight styrene-maleic anhydride copolymers which are excellently suited for surface sizing of paper and for use as the pigment binder in pigment containing paper coating compositions have been discovered. Surprisingly, despite their low viscosity the starch-copolymer compositions of this invention provide paper wtih improved water resistance and also provide starch-copolymer bonded pigment coated paper having improved wet rub resistance.

It is therefore an object of this invention to provide novel modified starches and paper coated therewith overcoming the disadvantages of the prior art. A more specific object of this invention is to provide water-dispersible starch compositions that enhance the water-resistance of paper coated therewith.

Another specific object is to provide water-dispersible starch compositions having improved pigment binding effectiveness and operational application advantages over prior art compositions.

These and other objects are accomplished in accordance with the present invention, generally speaking, by providing a composition or mixture of starch and a half-amide of a styrene-maleic anhydride copolymer derivative as a surface size, opacifier, and as a pigment binder for paper. More specifically, the invention contemplates a composition containing starch and a styrene-maleic anhydride copolymer in which substantially all of the acid anhydride groups are reacted with ammonia alone or in combination with an alkali metal hydroxide. A portion of the carboxyl groups are thereby converted to the amide and the balance to the ammonium or alkali metal salt. Any of the alkali metal salts, e.g., those of lithium, sodium, potassium, rhubidium, and caesium, can be employed to achieve the beneficial results of the invention. A convenient method of effecting such reaction with ammonia is set forth in U.S. Patent 2,607,762 granted Aug. 19, 1952 to A. H. Bowen. Alternately, the copolymer can be reacted with an amount of ammonia just sufficient to convert all of the anhydride groups to half amides without neutralizng the associated carboxyl groups. The carboxyl groups can then be neutralized by the addition of an alkali metal hydroxide. The half amide half alkali metal salts can also be prepared by reacting the corresponding ammonium salt with an alkali metal hydroxide. In any event, a portion of the potential carboxyl groups is converted to the amide and the balance to the salt. Although not essential for the purposes of the present invention, available evidence indicates that the amide and the salt groups are present in about equal quantities. Therefore, in the interest of clarity and convenience, the ammoniated copolymer will at times hereinafter be referred to as the half amide of the copolymer under consideration or merely as the polymeric half amide.

Modified starches are prepared in accordance with the present invention by mixng the starch with a half amide of an ammonium salt of a styrene-maleic anhydride copolymer. The ammoniated copolymer can constitute between about 1% and about 90% of the compositions by weight. For surface sizing it is preferred, however, to employ compositions containing between about 5% and about 20% of the half amide, with optimum results usually being obtained in the general neighborhood of about 10%. Less than about 1% of the polymeric half amide has no significant beneficial effect, whereas proportions in excess of about 90% inordinately detract from the desired characteristics of a starch size or pigment binder. For pigment binding applications the half amide preferably constitutes from about 5% to 50% by weight of the composition with starch.

The polymeric half amide can be blended with the starch in any convenient manner. Since it is readily soluble in water at room temperature, it can be blended with dry starch prior to the addition of water. However, it is generally more convenient to use the modifier in aqueous solution. The dry or dissolved modifier can be blended with dry starch or with an aqueous dispersion of the starch. Also, the half amide can be added to the starch before or after cooking with no measurable differences in its performance. In surface sizing applications the modified starches are applied to the paper as aqueous dispersions, usually at a concentration of about 10%. As pigment binders the modified starches are first mixed with the pigment in an aqueous dispersion. This concentration will of course vary widely with differing starches, base stocks, product specifications and other factors. Such dispersions can be applied to the paper web with standard size press, calender stack or any conventional coating equipment.

Regardless of the manner in which the polymeric half amide is mixed or blended with the starch, there is no evidence of any chemical reaction between the starch and the modifier while in solution. Thus no problem with viscosity build-up is encountered while holding or handling the mixture. However, during the paper-making operations subsequent to the application of the present modified starches to a cellulosic web, ammonia is liberated. Thus, at least a portion of the polymeric half amide reverts to an acid or acid anhydride. In view of the synergism exhibited between the starch and polymeric half amide, it is apparent that the modifier reacts with the starch in the presence of the cellulosic fibers, with cellulose in the presence of starch, or both. In any event, cellulose, starch and the polymeric half amide must be in intimate contact at the elevated temperatures usually encountered in paper-making operations to insure the complete occurrence of the reaction and its unexpected results. The reaction mechanism involved is not known. It is postulated that the modifier is activated during its partial or total de-ammoniation to form highly reactive nascent-type groups and that the reaction occurs at that time. Alternately, the reaction may be entirely subsequent to the ammonia liberation.

The polymeric half amide, half ammonium salt is most conveniently prepared by intimately contacting a substantially dry, granular styrene-maleic anhydride copolymer or partial alkali metal salt thereof with dry, gaseous ammonia. The reactants need not be anhydrous, and thus commercial grades of ammonia and the copolymer containing small amounts of water are usually employed. The exothermic reaction is initiated readily at room temperature and atmospheric or greater pressure. Because of its exothermic nature, no external heat need be applied to the reaction vessel. To insure substantially complete reaction of the anhydride groups, the reaction temperature is maintained between about 60° C. to about 70° C. until approximately 10% in excess of the theoretical molar amount of ammonia for complete reaction has been taken up by the copolymer or its partial salt. The requisite intimate contact is readily provided by agitating finely divided styrene-maleic anhydride copolymer or salt thereof in an atmosphere of ammonia. Since the rate of reaction increases with decreasing particle size, it is preferred to use a polymeric material in the size range of 100 mesh or less.

The product is a granular solid with an ammoniacal odor and is readily soluble in water at room temperature. Solutions of 25% and more can be easily prepared. The solutions thus obtained are basic and are stable for at least six months. The viscosity of the solutions can be controlled by pH adjustment or by electrolytes without adversely affecting their performance.

The type of styrene-maleic copolymer utilized in the preparation of the polymeric half amide is not particularly significant. It is only necessary that it contains an appreciable proportion of anhydride groups and that its ammoniation product is soluble in water. In general, it may be stated that copolymers having anhydride to styrene ratios from about 3:1 to about 1:3 and specific viscosities in methyl ethyl ketone in the approximate range of about 0.1 to 0.7 are particularly well suited for the purposes of the present invention. The indicated specific viscosity range includes copolymers in the styrene-maleic anhydride form having molecular weights in the general neighborhood of 2,000 to 10,000. Higher molecular weight polymers can be used to provide satisfactory products, but their high viscosity renders them quite difficult to adapt to commercial usage. Optimum results are obtained with copolymers having molecular weights between about 5,000 and 9,000.

The starch can be any of the natural starches or modified starches such as oxidized starches, enzyme converted starches, starch ethers and the like. Suitable starches include corn starch, potato starch, wheat starch, rice starch, sago starch, soluble starch, chlorinated starch, tapioca starch, arrow root starch, hydroxyethyl starch and other commercially available starches.

As indicated above the modified starch sizes of the present invention can be applied to cellulosic webs by the conventional methods used with ordinary starches. Since the polymeric half amide is readily soluble in water, the only procedural modification required is the incorporation of the modifier into the starch solution or suspension. The combined concentration of the starch and the modifier in the dispersion can vary widely depending primarily upon the amount to be deposited on the paper. In general, however, it has been found most convenient to utilize concentrations between about 3% and about 20%. Starch and modifier solutions can be added separately to the web prior to drying and calendering. But such separate applications usually complicate the operation without providing commensurate advantages.

The modifiers of the present invention increase the water resistance of starch films on paper up to about 1000%. In contrast to previously known starch insolubilizers, the modifiers of the present invention provide much greater water resistance while enhancing many of the other desirable properties of a starch sized paper. In fact, none of the advantageous characteristics of starch coated paper is adversely affected to a significant degree. Webs treated in accordance with the present invention exhibit improved porosity, increased fold resistance, Mullen burst strength, wet and dry tensile strength, pick resistance, pen and ink feathering, oil and ink holdout and gloss, while usually having very little effect on tear resistance, brightness and opacity. The present modifiers or insolubilizers also permit neutral to alkaline sizing, thereby reducing aging degradation. In addition, broke recovery of paper treated in the present manner present no problems.

When used in pigment binding applications the modified starches of this invention are suitably incorporated together with a pigment such as clay, talc, blanc fixe, titanium dioxide, calcium carbonate and the like in a medium such as water in such proportions so as to provide a total solids dispersion or mixture of from about 30 to about 70% by weight of solids, preferably from 50% to 65% solids for most applications. The binder or adhesive component in any such pigment coating compositions may be from about 5 parts to about 30 parts of binder per 100 parts of the pigment component or mixture of pigments. Generally from 10 to 20 parts of binder per 100 parts by weight of pigment are preferred for most paper coating purposes. The resulting pigment plus starch-half amide copolymer composition may be applied to a paper sheet or board by conventional paper coating means such as for example by means of an air knife or roll coating coater. Upon drying, the coated paper products of this invention are produced.

In addition to water, pigment, and binder, coating compositions may contain certain minor ingredients added for a number of reasons. In general these materials are defoamants, plasticizers, lubricants, dyestuffs, bactericides, stabilizers, thickeners, dispersants, etc. An important additive optionally incorporated into the present coating compositions are those materials which promote the curing of the styrene-maleic anhydride copolymer half amide. Such additives include polyethyleneimine, ureas, urea-formaldehyde resins, melamine resins, melamine-formaldehyde resins.

These pigment coated paper products thus comprise a paper or paper board base sheet and a coating adhered to at least one surface of the base sheet. The coating comprising a mineral or inorganic pigment the terms "mineral" and "pigment" being used interchangeably herein to refer to finely particulate material used to coat paper, and a pigment binder, said pigment binder comprising starch and a half amide half salt of a styrene-maleic copolymer having a molecular weight above about 2000 but below about 10,000, said salt selected from the group consisting of ammonium and alkali metals. Other additives as mentioned above can be present in minor amounts, the combined total weights of said additives constituting up to 10% by weight of the total pigment coating composition.

The invention and the manner in which its objects are achieved will be more readily understood by reference to the following illustrative prefered embodiments thereof. In these examples and throughout the specification, all proportions are expressed in parts by weight unless otherwise indicated.

In the examples herein the styrene-maleic anhydride copolymer employed was prepared in the following manner:

Substantially equimoleclular proportions of styrene and maleic anhydride were heated for substantially four hours in xylene at 100° C. under a slight pressure in the presence of 0.25% benzoyl peroxide catalyst based on the combined weight of the two monomers. The weight ratio of styrene plus maleic anhydride to solvent was 10% so that after the reaction an approximate 10% slurry of styrene-maleic anhydride copolymer was obtained. After the reaction was complete, the slurry was filtered and the filter cake dried in a vacuum drier.

EXAMPLE 1

This example describes a preferred method of making a polymeric half amide, half ammonium salt modifier of the present invention.

About 90 parts of substantially dry styrene-maleic anhydride copolymer was stirred vigorously in a suitable reaction vessel while gaseous ammonia was added thereto. The copolymer contained substantially equal portions of styrene and maleic anhydride, and had a specific viscosity of about 0.29 in methyl ethyl ketone. The copolymer reacts exothermically with the ammonia. Thus, the temperature of the reaction mixture is a function of the rate of ammonia addition. In this example, the ammonia was added at a rate such that the maximum reaction temperature was approximately 65° C. At the completion of the reaction, the take up of ammonia ceases. This usually requires approximately 10% in excess of the theoretical 2 moles of ammonia per mole of anhydride. In the instant case about 17 parts of ammonia were used in the reaction. The resulting product, substantially devoid of carboxyl groups, was a white, free-flowing powder readily soluble in water and having an ammoniacal odor.

EXAMPLE 2

The styrene-maleic anhydride copolymer was reacted with ammonia as in Example 1. About 23 parts of the resulting water soluble half amide, half ammonium salt was dissolved in 203 parts of water and approximately 4 parts of sodium hydroxide added. In so doing the more basic sodium ion displaces the weaker ammonium ion thus forming the desired styrene-maleic anhydride half amide, half sodium salt. The sodium salt thus formed is similar in appearance to the ammonium salt of Example 1 and is also readily soluble in water.

The salts of the other alkali metal salts can be readily prepared in like manner.

EXAMPLE 3

In order to illustrate the preparation and characteristics of an unmodified starch surface size, about 8 parts (dry basis) of a medium viscosity hydroxyethylated corn starch was slurried with about 15 parts water and then sufficient water added to provide 100 parts of mixture. The starch mixture was coked, with agitation, at about 90–95° C. for approximately 15 minutes, cooled to about 60–65° C., and applied to paper with a No. 18 Meyer Rod. This cooling was carried out only for laboratory control. In commercial practice solutions may be applied over a wide temperature range as normally practiced in the paper manufacturing processes. Two separate base stocks were treated in this manner. One, herein identified as Base Stock A, was a 41 lb. sheet containing 80% ground wood and 1.5% fortified rosin size. The second, Base Stock B, was a 40 lb. sheet containing 40% non-ground wood waste pulp, 25% bleached western kraft and 1% fortified rosin size. The treated sheets were divided into 3 portions and each portion dried in a different manner. One portion was air dried at 25° C.; the second oven dried at 120° C. for about 2 minutes; and the third dried at 120° C. for about 10 minutes. All of the dried sheets were then conditioned at 70–72° F. and 50–52% relative humidity prior to testing.

The water resistance of the dried, treated sheets was measured by placing a 5 microliter drop of a 50% lactic acid aqueous solution on the treated surface of the paper and recording the time of absorption in seconds. The results of this test are set forth in Table I.

EXAMPLE 4

The procedure of Example 3 was substantially repeated except that the polymeric half amide, half ammonium salt modifier of the present invention was added to the starch prior to cooking. In this example, a solution of about 0.8 part of the polymeric half amide in 20 parts of water was added to the starch slurry before the mixture was diluted with water to 100 parts. Thus the size of this example contained about 10% modifier based on the weight of the starch. The aqueous mixture of starch and polymeric half amide was then cooked, cooled and applied to Base Stocks A and B in the manner described above. The surface sized sheets were dried and tested in accordance with the procedure of Example 3, the test results being given in Table I.

EXAMPLE 5

The procedure of Example 3 was again repeated with modification. The starch slurry was diluted with water to 80 parts instead of 100 parts prior to cooking and cooling. After the starch had been cooled to 60–65° C., about 0.8 part of the half amide, half ammonium copolymer dissolved in 20 parts of water was uniformly mixed with the starch slurry. Here again, the modifier present was equal to about 10% of the weight of the starch. The results of the water resistance tests of sheets coated with the thus modified starch are set forth below.

EXAMPLES 6 and 7

The procedure of Examples 4 and 5 was again substantially repeated using the half amide, half sodium salt of Example 2 instead of the corresponding ammonium salt. The sheets thus treated were also air dried at 25° C. and oven dried at 120° C. for 2 and 10-minute periods as described in conjunction with the foregoing examples.

The sheets were then tested for water resistance and the results of the test are set forth in Table I immediately below.

TABLE I

| Starch Cook | Base Stock | Water Resistance (in sec.) | | |
|---|---|---|---|---|
| | | Air Dry | Heated 2 min. | Heated 10 min. |
| Example 3 | A | 500 | 500 | 500 |
| Example 3 | B | 535 | 535 | 535 |
| Example 4 | A | 2,496 | 4,870 | 4,860 |
| Example 4 | B | 4,750 | 6,000 | 6,000 |
| Example 5 | A | 2,765 | 4,105 | 4,970 |
| Example 5 | B | 5,580 | 6,000 | 6,000 |
| Example 6 | A | 1,840 | 4,700 | 3,220 |
| Example 6 | B | 4,820 | 6,000 | 6,000 |
| Example 7 | A | 2,160 | 4,790 | 4,800 |
| Example 7 | B | 5,140 | 6,000 | 6,000 |

These results graphically illustrate the superiority of the modified starches of the present invention and that the polymeric half amide can be blended with the starch before or after cooking.

The polymeric half amide modifiers were also compared directly with commonly used solid and liquid melamine-formaldehyde modifiers to emphasize the unexpected advantages of the present invention. The details and results of this comparison are set forth in the following example.

EXAMPLE 8

About 120 parts (dry basis) of a low viscosity hydroxyethylated corn starch were slurried with an equal amount of water and the slurry diluted to about 1350 parts with additional water. The mixture was cooked, with agitation, at about 99–95° C. for approximately 15 minutes and cooled to room temperature.

*Part A.*—About 270 parts of the starch suspension was diluted with about 30 parts water to obtain an 8% starch mixture. The mixture was then applied to a 50 pound book stock via a tub size application and dried. As in Examples 3–7, sheets treated in this manner were (a) air dried, (b) dried for 2 minutes at 120° C. and (c) 10 minutes at 120° C.

*Part B.*—About 2.4 parts of a solid, commercially available, melamine-formaldehyde resin were added to another 270 parts of the above starch solution and the mixture diluted with water to about 300 parts. This sizing solution or dispersion contained about 10% resin based on the weight of the starch. The size was then applied to paper and dried as described in the first portion of this example.

*Part C.*—A third 270 part aliquot of the above starch solution was taken and about 2.4 parts of a liquid, commercially available, melamine-formaldehyde resin were added thereto and the mixture diluted to about 300 parts with water. This sizing solution, like the one of Part B of the present example, contained about 10% resin based on the weight of the starch. The mixture was then applied to paper and dried in the manner set forth above.

*Part D.*—About 2.4 parts of the polymeric half amide from Example 1 was added to a fourth 270 part portion of the stock starch solution which was then diluted to 300 parts with water. It will be noted that this sizing composition also contained 10% modifier based on the weight of the starch. This composition was then applied to paper and dried as indicated above.

The papers sized in accordance with Example 8 were tested for water resistance by the lactic acid drop test which was described in connection with the preceding examples. The results of these tests, together with the amount of size or pick up retained by each of the samples, is set forth in the following table wherein pickup is expressed as pounds of size per 3000 square feet of paper.

TABLE II

| Starch Cook | Pick Up | Water Resistance (in.-sec.) | | |
|---|---|---|---|---|
| | | Air Dry | Heated 2 min. | Heated 10 min. |
| Example 8: | | | | |
| Part A | 6.4 | 154 | 95 | 131 |
| Part B | 6.9 | 172 | 94 | 76 |
| Part C | 6.9 | 104 | 84 | 62 |
| Part D | 7.5 | 1,466 | 688 | 622 |

By reference to the above table, it will be noted that the starch modifier of the present invention set forth as Part D yields papers whose water resistance is much greater than paper sized with unmodified starch or starch modified with melamine-formaldehyde resins.

EXAMPLE 9

The synergistic activity of the two-component sizing agent of this invention is graphically illustrated by the following example.

In each of a plurality of runs, sheets of paper (a 56 lb. unsized, printing grade base stock) were coated at two levels with the specified materials and then tested for water resistance by the lactic acid drop test as described in conjunction with Examples 3–8 and for porosity using the Gurley S–P–S Tester according to the Tappi Standard procedure T460m–49. In each instance where a combination of starch and a polymeric half amide was employed, the half amide is present in amounts of 10% based on the weight of the starch. The results of these evaluations are set forth in Table III. In this table, C is used to designate the half amide, half ammonium copolymeric salt and D to designate the corresponding sodium salt.

TABLE III

| Run No. | Coating Agent | Coating Weight in lbs./1,000 sq. ft. | Water Resistance (in.-sec.) | Porosity |
|---|---|---|---|---|
| 1 | 8% Starch | 0.76 | 35 | 31 |
| 2 | do | 0.96 | 53 | 44 |
| 3 | 3% C | 0.54 | 46 | 36 |
| 4 | 3% C | 0.86 | 122 | 146 |
| 5 | 3% D | 0.52 | 43 | 32 |
| 6 | 3% D | 0.85 | 116 | 139 |
| 7 | 8% Starch plus C | 0.64 | 308 | 482 |
| 8 | do | 1.01 | 2,330 | 1,305 |
| 9 | 8% Starch plus D | 0.63 | 287 | 473 |
| 10 | do | 0.96 | 2,340 | 1,267 |

Examination of the data of Table III shows that the two-component sizing agents of this invention (runs 7–10) are truly synergistic in that their combined water resisting effect exceeds the effects of the components (starch and the half amide salts) used above (runs 1–6).

The term "paper" is used herein in its broadest sense to designate various types of matter or felted webs or fibers (usually vegetable but sometimes mineral, animal or synthetic) formed on a fine wire screen from a water suspension.

EXAMPLE 10

A paper coating composition utilizing modified starches of this invention (Sample A) as a pigment binder was formulated in the following manner. To 1034 milliliters of water was added:

| | Grams |
|---|---|
| Georgia kaolinite clay | 575 |
| Titanium dioxide | 175 |
| Starch-styrene/maleic anhydride half amide half ammonium salt of Example 4 composition containing 10%, by weight of the half amide based on the weight of the starch | 135 |
| Tetrasodium pyrophosphate | 1.875 |

The ingredients were thoroughly mixed and applied to paper with an air knife coater.

Paper coating compositions were also prepared using starch modified with 10 percent by weight, based on the starch weight, of styrene-maleic-half amide copolymers of higher molecular weights (over 10,000) as indicated by the specific viscosities in methyl ethyl ketone of over 0.7. They are termed samples B and C.

Each coating composition was adjusted to a pH between 8.9 and 9.1 with ammonium hydroxide.

Table IV shows that these pigments coating compositions containing low molecular weight starch-styrene-maleic half amide compositions as the pigment binder (Sample A) are comparable in wet rub resistance to pigment coatings containing pigment binders made from much higher molecular weight copolymer half amides (Samples B and C) even though the viscosity of the copolymer in dimethylformamide (DMF) water, and mixed with starch is substantially less than the viscosity of the higher molecular weight copolymer containing pigment binders under the same conditions.

TABLE IV

| | Pigment Binder Sample | | |
|---|---|---|---|
| | Starch plus 10% A | Starch plus 10% B | Starch plus 10% C |
| Specific Viscosity of Copolymer A, B, or C, 1% in DMF | 0.33 | 0.74 | 0.89 |
| Viscosity of A, B, or C 0.2% in H₂O | 2.2 | 4.1 | 5.6 |
| Viscosity Starch plus 10% A, B, or C, cps | 19 | 40 | >40 |
| Binder Solids in Coating Composition, (parts/100 parts of composition) | 18 | 18 | 18 |
| Percent Solids in Coating Composition | 58 | 58 | 58 |
| Wet Rub, gm. rubbed of dried coated sheet [1] | 0.0042 | 0.0025 | 0.0028 |

[1] Test procedure described in TAPPI, vol. 43, No. 11, p. 923, November 1960.

Table V shows that these pigment coating compositions containing low molecular weight starch/styrene-maleic half amide compositions (Sample A) as a pigment binder are substantially superior to the diammonium (Sample D) and disodium (Sample E) salt containing copolymers of the same molecular weight in that they are from 4 to 8 times more wet rub resistant. The pH of each coating formulation was adjusted to between 8.9 and 9.1 with hydrochloric acid or ammonium hydroxide as needed.

TABLE V

| | Pigment Binder Sample | | |
|---|---|---|---|
| | A | D | E |
| Binder Solids in Coating Composition | 18 | 18 | 18 |
| Percent Solids in Coating Composition | 58 | 58 | 58 |
| Wet Rub Resistance, gm. of dried coated sheet | 0.0042 | 0.0310 | 0.195 |

EXAMPLE 11

For this example particulate pigment coating formulations were compounded to compare the effectiveness of the half amide half salt styrene-maleic copolymer-starch compositions of this invention as a pigment binder in the pigment coating of paper against a commercially known melamine-formaldehyde resin used for the same pigment binding purpose. The formulations contained the following ingredients:

TABLE VI

| Ingredient | Formulation (in parts by weight) | | |
|---|---|---|---|
| | 1 | 2 | 3 (control) |
| Clay (kaolinite) | 75 | 75 | 75 |
| CaCO₃ | 25 | 25 | 25 |
| Sodium hexametaphosphate | .25 | .25 | .25 |
| Oxidized corn starch | 18 | 18 | 18 |
| Half-amide, half-NH₄ salt Styrene/Maleic Copolymer of Example 1 | 1.8 | | |
| Melamine-Formaldehyde Resin [1] | | 1.8 | |

[1] A commercially available melamine-formaldehyde resin composition containing 62% formaldehyde, 24.8% melamine, 8% polysaccharides, 5% p-toluenesulfonamides, 0.2% HCl-tert. alkylamine catalyst sold for use as water resistance and wet rub improvement of paper coating.

The ingredients of each formulation were thoroughly mixed in sufficient water to give compositions having 58 percent by weight total solids. The pigment component was the combined clay and calcium carbonate. The formulation containing the half amide half ammonium styrene-maleic copolymer as the starch modifier was adjusted to pH 9 with ammonium hydroxide. The formulation containing the melamine-formaldehyde resin as the starch modifier was adjusted to pH 6.6 with hydrochloric acid solution. Each pH was considered optimum for best binding efficiency of the two binder compositions. The control unmodified starch containing composition was adjusted to pH 7. The respective formulations were applied to paper with an air knife coater in an amount sufficient to provide a coating weight of 4 to 6 lb./3000 square feet minimum (constant).

TABLE VII

| Formulation | Wet Rub Resistance [1] Adams Tester (gm.) | |
| --- | --- | --- |
| | At Once [2] | 2 Weeks |
| 1 | 0.0036 | 0.0027 |
| 2 | 0.0165 | 0.0074 |
| 3 (control) | 0.0275 | 0.0159 |

[1] See footnote in Example 10, supra, for citation to test procedure.
[2] Test run on dried coated paper immediately after preparation.

These data show that the low molecular weight half amide half salt styrene-maleic copolymer-starch formulations are about four times as effective as the melamine-formaldehyde resin-starch formulation, and about six times more effective than the unmodified starch as a pigment binder.

The embodiments of the invention in which an exclusive property or privilege is claimed are defined as follows:

1. A composition consisting essentially of starch and between about 1% and about 90% based on the weight of the starch of a half amide half salt styrene-maleic copolymer having a molecular weight in the styrene-maleic anhydride form of from about 2000 up to 10,000, said salt being selected from the group consisting of ammonium and the alkali metals.

2. A composition as described in claim 1 wherein the half amide half salt styrene-maleic copolymer is present in an amount of from about 5 percent to about 20 percent based on the weight of the starch, and said half salt moiety of the copolymer is an alkali metal salt.

3. A composition as described in claim 2 wherein the half amide half salt styrene-maleic copolymer is present in an amount of about 5 percent to about 20 percent by weight based on the weight of the starch, and the alkali metal is sodium.

4. A composition as described in claim 1 wherein the half amide half salt styrene-maleic anhydride copolymer is present in an amount of from about 5 percent to about 20% by weight based on the weight of the starch, and said half salt moiety of the copolymer is the ammonium salt.

5. A composition as described in claim 1 wherein the half amide half salt styrene-maleic copolymer is present in an amount of from about 5 percent to about 20% based on the weight of the starch, said copolymer in the styrene-maleic anhydride form having a molecular weight of from about 5000 to about 9000, said salt moiety of said copolymer being the ammonium salt.

6. A composition as described in claim 1 wherein the half amide half salt styrene-maleic copolymer is present in an amount of from about 5 percent to about 20 percent based on the weight of the starch, said copolymer in the styrene-maleic anhydride form having a molecular weight of from about 5000 to about 9000, said salt moiety of said copolymer being an alkali metal salt.

7. A composition as described in claim 6 wherein said half amide half alkali metal salt styrene-maleic copolymer is present in an amount of from about 5 percent to about 20 percent by weight based on the weight of the starch, and the alkali metal is sodium.

8. A method comprising applying to a cellulosic web an aqueous dispersion consisting essentially of starch and between about 1 percent and about 90 percent based on the weight of the starch of a half amide, half salt styrene-maleic copolymer in the styrene-maleic anhydride form having a molecular weight of from about 2000 up to 10,000, said salt being selected from the group consisting of ammonium and the alkali metals, and drying the thus treated cellulosic web.

9. A method as described in claim 8 wherein the aqueous dispersion of starch and half amide half salt copolymer contains from about 5 percent to about 20 percent by weight based on the weight of the starch of said half amide half salt styrene-maleic copolymer, said copolymer in its styrene-maleic anhydride form having a molecular weight of from about 5000 to about 9000, and said half salt of said copolymer being the ammonium salt.

10. A method as described in claim 8 wherein the aqueous dispersion of starch and the half amide half salt copolymer contains from about 5 percent to about 20 percent by weight based on the weight of the starch of said half amide half salt styrene-maleic copolymer, said copolymer in its styrene-maleic anhydride form having a molecular weight of from about 5000 to about 9000, and said half salt of said copolymer being an alkali metal salt.

11. A mineral pigment coating composition comprising an aqueous dispersion of a particulate mineral, and a modified starch consisting essentially of starch and from 1 to 90 percent by weight, based on the weight of the starch, of a half amide half salt of a styrene-maleic copolymer having a molecular weight of from about 2000 up to 10,000, said salt being selected from the group consisting of ammonium and the alkali metals.

12. A composition as described in claim 11 wherein in the aqueous dispersion the particulate mineral is a mixture of clay and titanium dioxide, and the salt moiety of the styrene-maleic half amide copolymer is ammonium.

13. A paper web coated with a composition consisting essentially of starch and between about 1 percent and 90 percent based on the weight of the starch of a half amide half salt styrene-maleic copolymer, having in the styrene-maleic anhydride form a molecular weight of from about 2000 up to 10,000, said salt being selected from the group consisting of ammonium and the alkali metals.

14. A coated paper web as described in claim 13 wherein the half amide half salt styrene-maleic copolymer is present in an amount of from about 5 percent to about 20 percent by weight based on the weight of the starch, the copolymer in its styrene maleic anhydride form having a molecular weight of from about 5000 to about 9000, and said half salt of said copolymer is the ammonium salt.

15. A coated paper web as described in claim 13 wherein the half amide half salt styrene-maleic copolymer is present in an amount of from about 5 percent to about 20 percent by weight based on the weight of the starch, the copolymer in its styrene-maleic anhydride form having a molecular weight of from about 5000 to about 9000, and said half salt of said copolymer being an alkali metal salt.

16. A coated paper product comprising a paper base sheet and a coating adhered to at least one surface of said paper base sheet, said coating comprising particles of a mineral pigment and a composition consisting essentially of starch and from 5 to 90% by weight, based on the weight of said starch of a half amide half salt of a styrene-maleic anhydride copolymer having in its styrene-maleic anhydride form a molecular weight of from about 2000 up to 10,000, said salt being selected from the group consisting of ammonium and the alkali metals.

17. A coated paper product as described in claim 16 wherein the mineral pigment is a mixture of clay and titanium dioxide, the half amide half salt styrene-maleic copolymer in its styrene maleic anhydride form having a molecular weight of from about 5000 to about 9000, and the half salt of said copolymer is ammonium.

References Cited
UNITED STATES PATENTS

| | | | |
|---|---|---|---|
| 2,640,819 | 6/1953 | Barrett | 260—785 |
| 3,259,596 | 7/1966 | Downer et al. | 260—17.4 |

WILLIAM H. SHORT, *Primary Examiner.*

J. NORRIS, *Assistant Examiner.*